(12) United States Patent
Huang et al.

(10) Patent No.: US 7,500,413 B2
(45) Date of Patent: Mar. 10, 2009

(54) STEP-BY-STEP MOTOR ABLE TO CARRY OUT UP-AND-DOWN MOTION

(76) Inventors: Hsian-Yi Huang, P.O. Box 90, Tainan City 70499 (TW); Hsiu-Ming Huang, P.O. Box 90, Tainan City 70499 (TW)

( * ) Notice: Subject to any disclaimer, the term of this patent is extended or adjusted under 35 U.S.C. 154(b) by 208 days.

(21) Appl. No.: 11/723,986

(22) Filed: Mar. 23, 2007

(65) Prior Publication Data

US 2008/0231148 A1  Sep. 25, 2008

(51) Int. Cl.
*F16H 1/16* (2006.01)
(52) U.S. Cl. .................. 74/425; 362/549; 362/467; 362/524
(58) Field of Classification Search ............ 74/425; 362/549, 464, 465, 466, 467, 523, 524
See application file for complete search history.

(56) References Cited

U.S. PATENT DOCUMENTS 5,678,916 A * 10/1997 Watanabe et al. .......... 362/465
6,511,215 B2 * 1/2003 Hashigaya ................. 362/515
7,455,149 B2 * 11/2008 Segawa et al. ............. 180/444

* cited by examiner

*Primary Examiner*—David M Fenstermacher (57) ABSTRACT

A step-by-step motor able to carry out up-and-down motion includes a housing, a transmitting gear, a worm gear, an interacting member, a top rod, a circuit board with a transmitting motor, a cover body and an adjusting member. The level of the headlamp of an automobile can be adjusted by inserting an adjustment tool through one lateral through hole of the recessed chamber of the cover body from outside to have the engage teeth of the adjustment tool engaged with one engage notch of the adjusting member and turning the adjustment tool to actuate the adjusting member to rotate and actuate the top rod to move upward, or by inserting an adjustment tool in the bottom slit of the projecting post of the adjusting member and turning it around to drive the adjusting member to rotate and actuate the top rod and the headlamp to move upward or downward.

6 Claims, 10 Drawing Sheets

STEP-BY-STEP MOTOR ABLE TO CARRY OUT UP-AND-DOWN MOTION

BACKGROUND OF THE INVENTION

1. Field of the Invention

This invention relates to a step-by-step motor able to carry out up-and-down motion, particularly to one able to manually adjust a top rod to actuate the headlamp of an automobile to move upward or downward to a proper level by inserting an adjustment tool into a through hole of a cover body from the exterior of a cover body.

2. Description of the Prior Art

Figure 1:
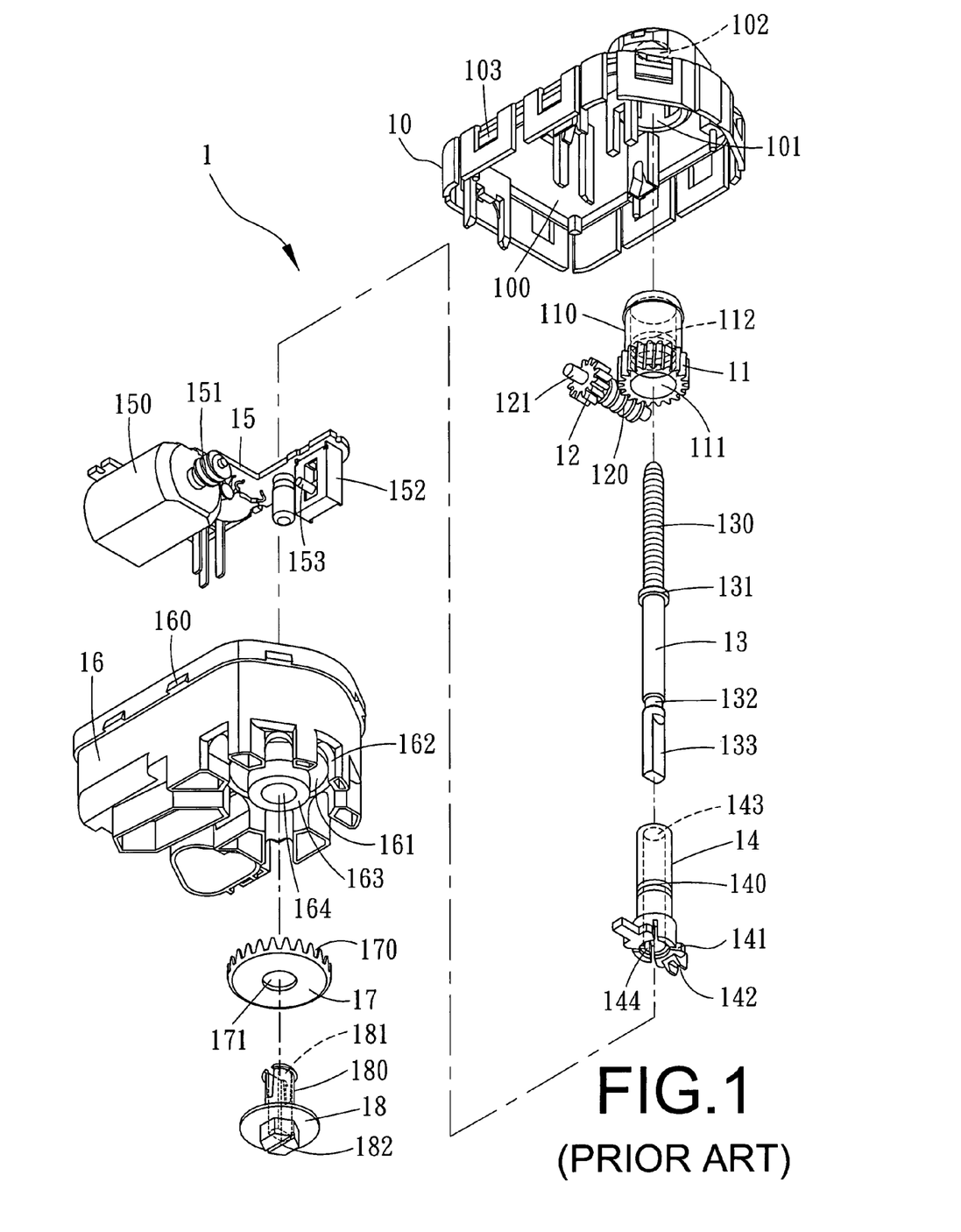
FIG. 1 is an exploded perspective view of a conventional step-by-step motor.
Figure 2:
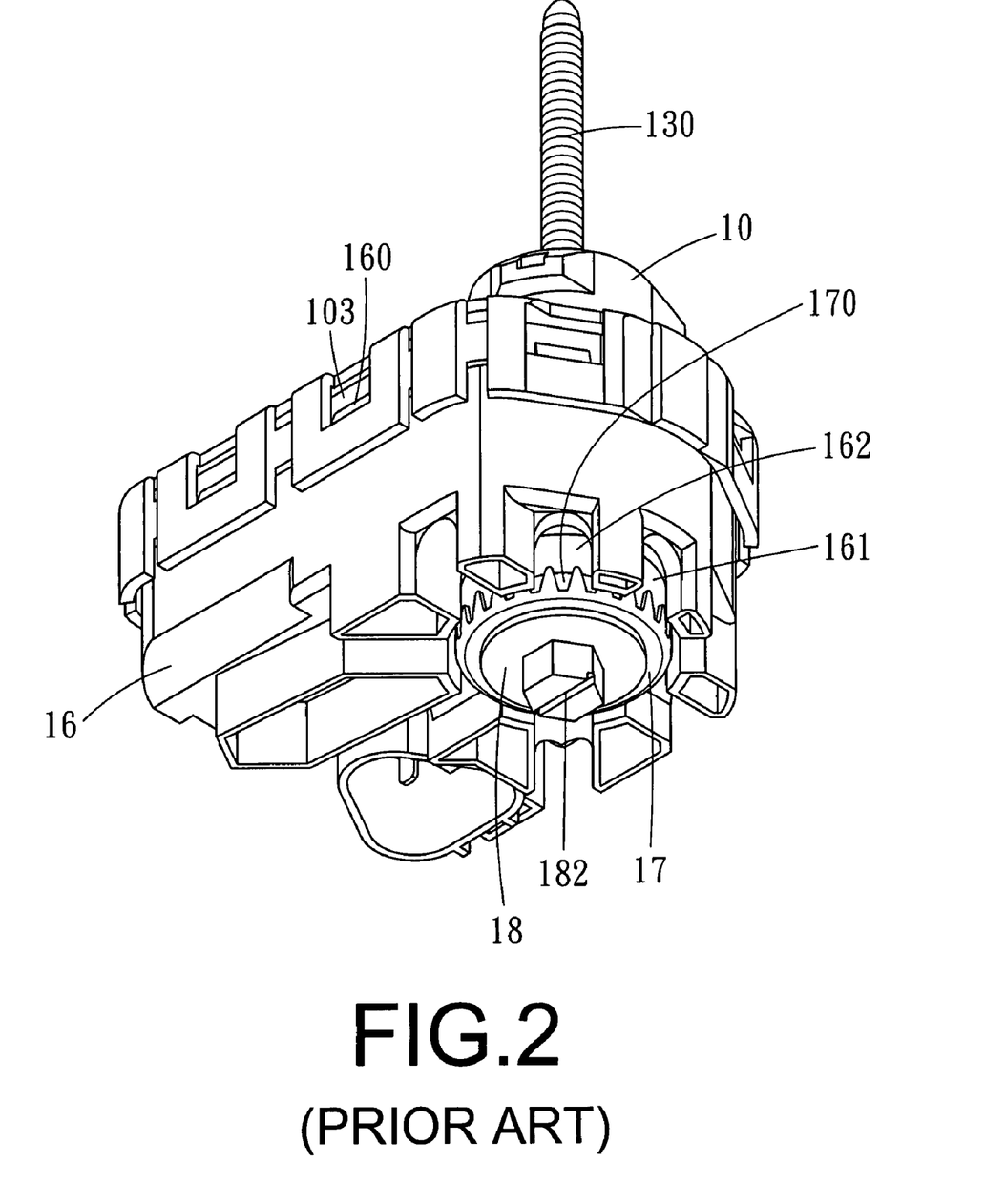
FIG. 2 is a perspective view of the conventional step-by-step motor.
Figure 3:
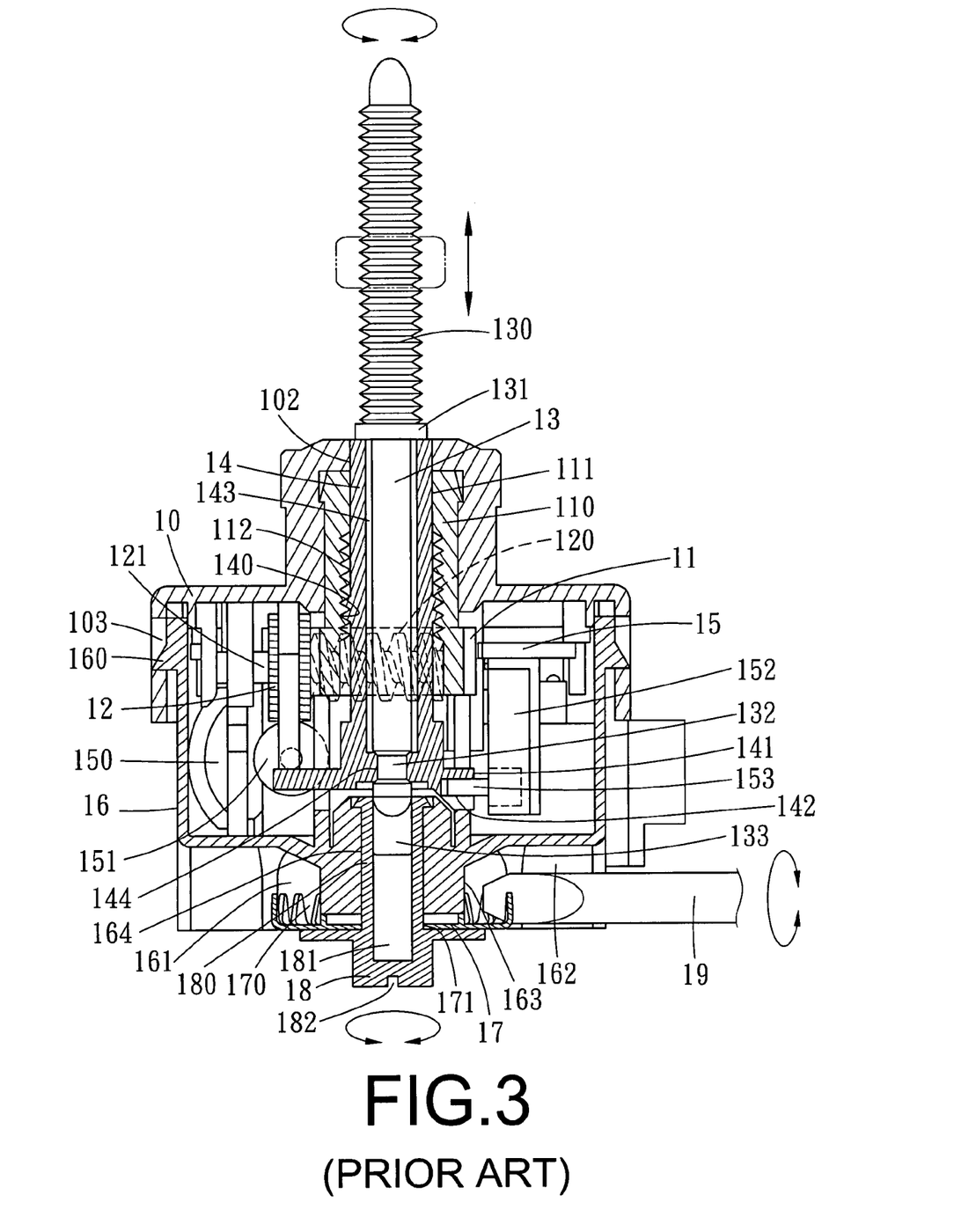
FIG. 3 is a cross-sectional view of the conventional step-by-step motor.
Figure 4:
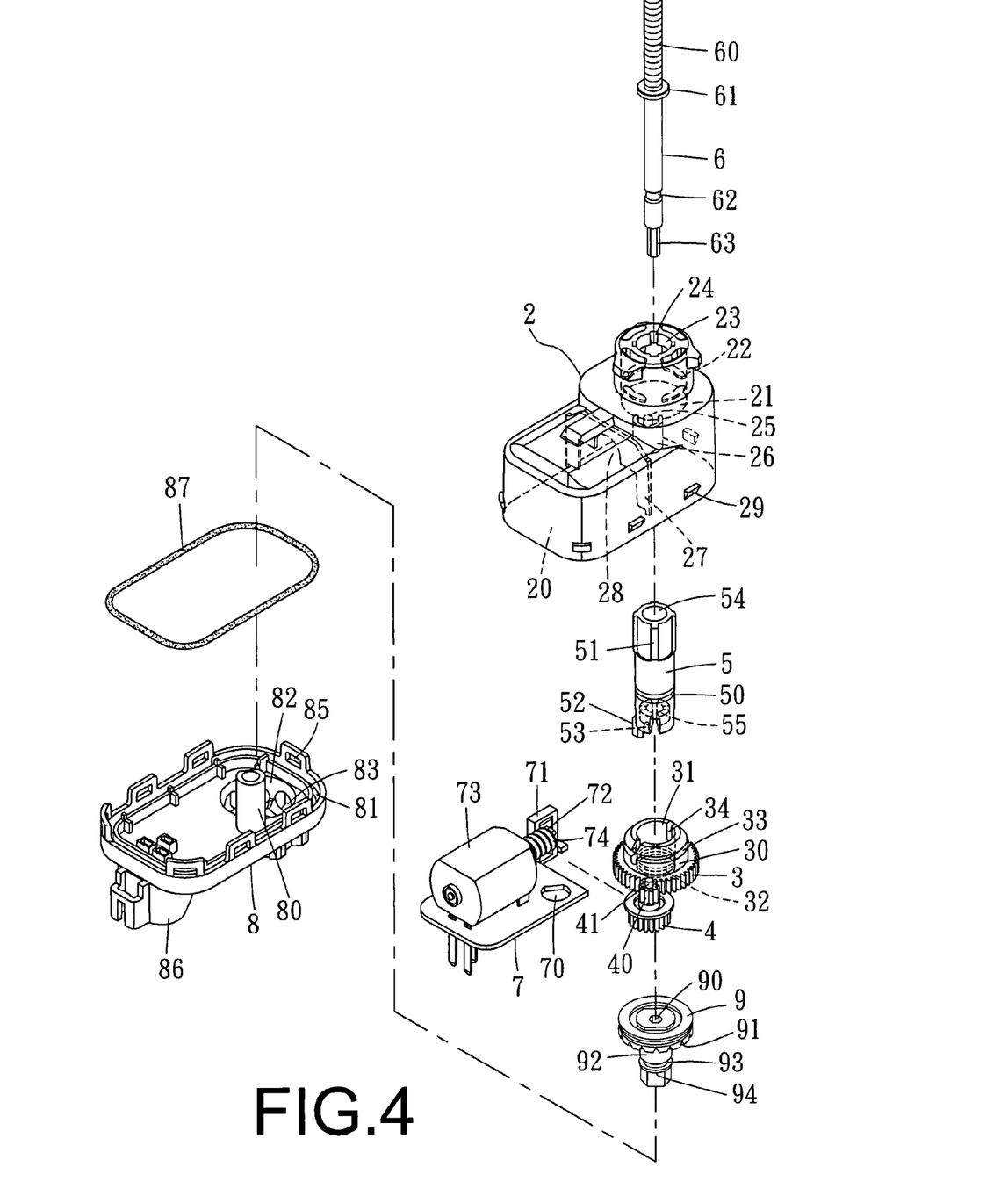
FIG. 4 is an exploded perspective view of a first preferred embodiment of a step-by-step motor in the present invention.
Figure 5:
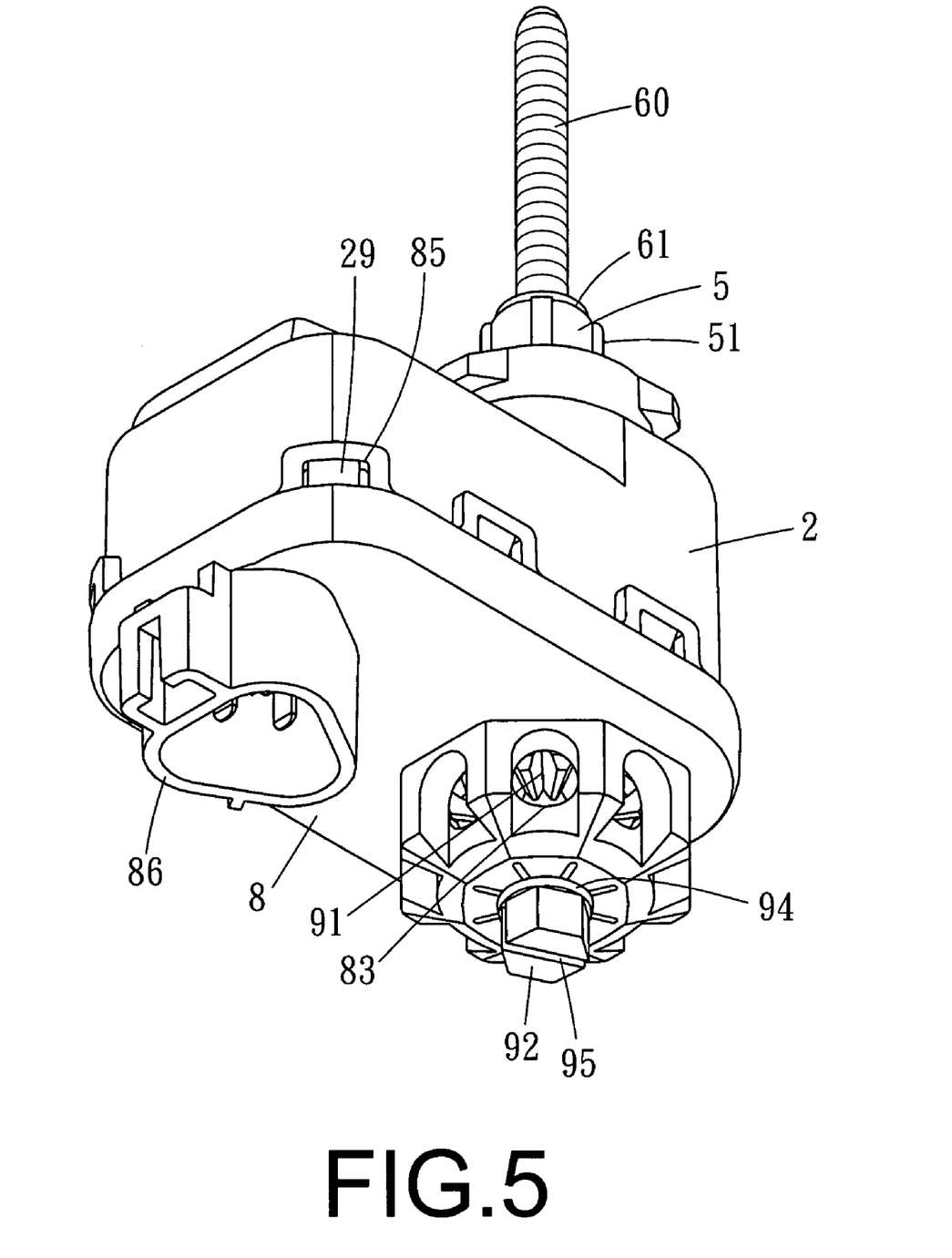
FIG. 5 is a perspective view of the first preferred embodiment of the step-by-step motor in the present invention.

Generally, the headlamp of an automobile is provided with a step-by-step motor for adjusting the level of the headlamp. A conventional step-by-step motor 1, as shown in FIGS. 1, 2 and 3, includes a housing 10, a driven worm gear 11, a transmitting worm gear 12, a top rod 13, an interacting member 14, a circuit board 15, a cover body 16, a serrated plate 17 and an adjusting block 18 combined together.

The housing 10 is provided inside with an accommodating chamber 100 having its interior formed with a recessed chamber 101 having a central insert hole 102 passing through the topside of the housing 10. The housing 10 further has its peripheral wall bored with a plurality of engage slots 103 spaced apart.

The driven worm gear 11 to be received in the accommodating chamber 100 of the housing 10 is provided with a connecting block 110 at the upper side and bored with a central insert hole 111 formed with female threads 112.

The transmitting worm gear 12 to be assembled at one side of the driven worm gear 11 has one side disposed with a driven worm 120 engaged with the driven worm gear 11 and the other side fixed with a support shaft 121.

The top rod 13 to be inserted through both the insert hole 111 of the driven worm gear 11 and the insert hole 102 of the housing 10 has its upper section provided with male threads 130 and its intermediate outer wall secured with an annular blocking plate 131. Further, the top rod 13 has its outer wall bored with an annular recess 132 near the lower end and has its lower section formed with an insert rod 133.

The interacting member 14 is to be fitted around the top rod 13 and inserted through the insert hole 111 and 102 of the driven worm gear 11 and the housing 10. The interacting member 14 has its outer circumferential wall provided with male threads 140 and its lower side provided with an interacting block 141 with an engage notch 142, and is further bored in the interior with a central insert hole 143 having a plurality of engage blocks 144 fixed near the bottom to be engaged with the annular recess 132 of the top rod 13.

The circuit board 15 to be received in the accommodating chamber 100 of the housing 10 is assembled thereon with a transmitting motor 150 having a transmitting worm 151 engaged with the transmitting worm gear 12, and a position-limiting switch 152 provided with a cross bar 153 to be engaged in the engage notch 142 of the interacting member 14.

The cover body 16 to be covered on the bottom of the housing 10 has its peripheral outer wall fixed thereon with a plurality of engage projections 160 spaced apart to be respectively engaged and positioned in the engage slots 103 of the housing 10, and its bottom side formed with a recessed chamber 161, which has its peripheral wall cut with plural notches 162 spaced apart and its interior fixed with a projecting post 163 with a central insert hole 164.

The serrated disc 17 is to be positioned in the recessed chamber 161 at the lower side of the cover body 16 to resist against the lower side of the projecting post 163 of the cover body 16. The serrated disc 17 has one side disposed with a plurality of engage notches 170 and its center bored with an insert hole 171 aligned to the insert hole 164 of the projecting post 163 of the cover body 16.

The adjusting block 18 to be positioned under the serrated disc 17 is secured in the center with a projecting post 180 to be inserted through the insert hole 171 of the serrated plate 17 and positioned in the insert hole 164 of the cover body 16. The projecting post 180 of the adjusting block 18 is bored with a central insert hole 181 for the insert rod 133 of the top rod 13 to be inserted therein. Further, the adjusting block 18 has its underside cut with a slit 182 for an adjustment tool 19 to be inserted and turned therein, thus finishing assembly of the conventional step-by-step motor 1.

However, the adjustment structure of the conventional step-by-step motor 1 for manually adjusting the top rod 13 to move upward or downward is provided under the cover body 16, and the serrated disc 17 and the adjusting block 18 are positioned at the exterior of the cover body 16 without being covered by the cover body 16. Under the circumstances, the serrated disc 17 and the adjusting block 18 are likely to fall off the cover body 16 and easy to be damaged, rendering the top rod 13 impossible to be manually adjusted to move upward or downward. In addition, in case the transmitting motor 150 of the step-by-step motor 1 cannot be started to operate, it is impossible to carry out adjustment manually.

SUMMARY OF THE INVENTION

The objective of this invention is to offer a step-by-step motor able to carry out up-and-down motion, able to be assembled stably, impossible to be damaged and convenient to manually adjust a top rod to actuate the headlamp of an automobile to ascend or descend from the exterior of the step-by-step motor.

The step-by-step motor in the present invention includes a housing formed with an accommodating chamber in the interior. The accommodating chamber is bored inside with a recessed chamber provided therein with plural engage projections spaced apart and bored with a center insert hole passing through the topside of the housing. The insert hole of the recessed chamber has its wall cut with plural lengthwise positioning engage notches spaced apart, and the recessed chamber has one side bored with a shaft hole having its outer circumference fixed with a blocking plate. The accommodating chamber of the housing has its inner wall set with a positioning plate with a notch, and the housing further has its outer peripheral wall fixed thereon with a plurality of engage projections spaced apart. A driven gear to be received in the accommodating chamber of the housing has its upper side formed with a connecting block to be positioned in the recessed chamber of the housing. The connecting block of the driven gear is bored with a center insert hole having its lower section provided with female threads, and further has its outer wall bored with an annular recess and two opposite axial notches. A worm gear assembled at one side of the driven gear has its upper side secured with a transmitting gear engaged with the driven gear and provided thereon with a support shaft. An interacting member inserted in both the insert hole of the driven gear and the insert hole of the housing has a part of its outer circumferential wall provided with male threads and its upper outer wall disposed with a plurality of lengthwise projections spaced apart equidistantly. The interacting member further has its lower side fixed with an interacting block with an engage notch and its center bored with an insert hole disposed with plural engage blocks secured near the lower end. A top rod inserted through the central insert hole of the interacting member has its upper section provided with male threads and its outer wall fixed with a blocking flange under the male threads and bored with an annular recess near the lower end to be engaged with the engage blocks in the insert hole of the interacting member. The top rod further has its lower section formed with a polygonal rod. A circuit board installed in the accommodating chamber of the housing is assembled thereon with a position-limiting switch with a movable cross bar, and a transmitting motor having a worm engaged with the worm gear. A cover body covered on the bottom of the housing is formed inside with a recessed chamber bored with plural through holes in the circumferential wall and an insert hole at the bottom. The cover body has its upper peripheral edge bored with plural engage slots and its underside installed with a bayonet socket. An adjusting member positioned in the recessed chamber of the cover body has its center bored with a polygonal recessed hole and its lower circumferential edge annularly cut with a lot of engage notches. The adjusting member is fixed with a projecting post extending downward from the bottom and having its bottom cut with a slit.

Further, the step-by-step motor able to carry out up-and-down motion in the present invention includes a housing formed with an accommodating chamber in the interior. The accommodating chamber is bored inside with a recessed chamber provided therein with plural engage projections spaced apart and bored with a center insert hole passing through the topside of the housing. The insert hole of the recessed chamber has its wall cut with plural lengthwise positioning engage notches spaced apart, and the recessed chamber has one side bored with a shaft hole having its outer circumference fixed with a blocking plate. The accommodating chamber of the housing has its inner wall set with a positioning plate with a notch, and the housing further has its outer peripheral wall fixed thereon with a plurality of engage projections spaced apart. A driven gear to be received in the accommodating chamber of the housing has its upper side formed with a connecting block to be positioned in the recessed chamber of the housing. The connecting block of the driven gear is bored with a center insert hole having its lower section provided with female threads, and further has its outer wall bored with an annular recess and two opposite axial notches. A worm gear assembled at one side of the driven gear has its upper side secured with a transmitting gear engaged with the driven gear and provided thereon with a support shaft. An interacting member inserted in both the insert hole of the driven gear and the insert hole of the housing has a part of its circumferential wall provided with male threads and its upper outer wall disposed with a plurality of lengthwise projections spaced apart equidistantly. The interacting member further has its lower side fixed with an interacting block with an engage notch and its center bored with an insert hole provided therein with female threads. A top rod inserted through the center insert hole of the interacting member has its upper section provided with male threads, and its outer wall fixed with a blocking flange under the male threads. The top rod is also provided with male threads near its lower section to be combined with the female threads of the interacting member, and further has its lower section formed with a polygonal rod. A circuit board installed in the accommodating chamber of the housing is assembled thereon with a position-limiting switch with a movable cross bar, and a transmitting motor having a worm engaged with the worm gear. A cover body covered on the bottom of the housing is formed inside with a recessed chamber bored with plural through holes in the circumferential wall and an insert hole at the bottom. The cover body has its upper peripheral edge bored with plural engage slots and its underside installed with a bayonet socket. An adjusting member positioned in the recessed chamber of the cover body has its center bored with a polygonal recessed hole and its lower circumferential edge annularly cut with a lot of engage notches. The adjusting member is fixed with a projecting post extending downward from the bottom and having its bottom cut with a slit.

BRIEF DESCRIPTION OF DRAWINGS

This invention will be better understood by referring to the accompanying drawings, wherein.

DETAILED DESCRIPTION OF THE PREFERRED EMBODIMENT

A first preferred embodiment of a step-by-step motor able to carry out up-and-down motion in the present invention, as shown in FIGS. 4 to 7, includes a housing 2, a driven gear 3, a worm gear 4, an interacting member 5, a top rod 6, a circuit board 7, a cover body 8 and an adjusting member 9 combined together.

The housing 2 is provided in the interior with an accommodating chamber 20 bored therein with a recessed chamber 21 disposed inside with plural engage projections 22 spaced apart. The recessed chamber 21 is bored with a central insert hole 23 passing through the topside of the housing 2 and having its wall cut with a plurality of positioning engage notches 24, and has one side bored with a shaft hole 25 having its outer circumference provided with a blocking plate 26. Further, the accommodating chamber 20 of the housing 2 has its inner wall fixed with a positioning plate 27 with a notch 28, and the housing 2 has its outer wall secured with a plurality of engage projections 29 spaced apart.

The driven gear 3 to be received in the accommodating chamber 20 of the housing 2 has its upper side provided with a connecting block 30 to be positioned in the recessed chamber 21 of the housing 2. The connecting block 30 is bored with a central insert hole 31 having its lower section provided with female threads 32, and has its outer wall provided with an annular recess 33 for the engage projections 22 in the recessed chamber 21 of the housing 2 to be engaged therein and also bored with two opposite notches 34.

The worm gear 4 to be assembled at one side of the driven gear 3 has its upper side provided with a transmitting gear 40 engaged with the driven gear 3, and a support shaft 41 to be inserted in the shaft hole 25 of the housing 2.

The interacting member 5 is to be inserted in the inner hole 31 of the driven gear 3 and the insert hole 23 of the housing 2. The interacting member 5 has its outer wall provided with male threads 50 to be combined with the female threads 32 of the driven gear 3 and has its upper outer wall secured thereon with a plurality of lengthwise projections 51 spaced apart equidistantly to be respectively engaged in the positioning engage notches 24 of the insert hole 23 of the housing 2 for stopping the interacting member 5 from rotating. In addition, the interacting member 5 has its lower side fixed with an interacting block 52 with an engage notch 53 and its center bored with an insert hole 54 fixed therein with a plurality of engage blocks 55 spaced apart near the lower end.

The top rod 6 to be inserted in the insert hole 54 of the interacting member 5 has its upper section provided with male threads 60 and its outer wall secured with a blocking flange 61 under the male threads 60 for blocking and holding the upper edge of the interacting member 5. The top rod 6 is formed with an annular recess 61 near the lower end for engaging the engage blocks 55 in the insert hole 54 of the interacting member 5 and has its lower end formed with a polygonal rod 63.

The circuit board 7 to be positioned in the accommodating chamber 20 of the housing 2 is bored with a through hole 70 and assembled thereon with a position-limiting switch 71 having a movable cross bar 72 to be engaged in the engage notch 53 of the interacting block 52 of the interacting member 5. Further, the circuit board 7 is assembled thereon with a transmitting motor 73 having a worm 74 engaged with the worm gear 4.

The cover body 8 to be mounted on the bottom of the housing 2 is fixed in the interior with a positioning post 80 to be inserted through the through hole 70 of the circuit board 7 and has its inner peripheral side disposed with an annular recess 81 for receiving a waterproof gasket 87 therein and its interior formed with a recessed chamber 82, which is bored with plural through hole 83 in the circumferential wall and an insert hole 84 at the bottom. The cover body 8 further has its upper peripheral edge bored with a plurality of engage slots 85 spaced apart to be respectively engaged with the engage projections 29 on the outer wall of the housing 2, and is installed with a bayonet socket 86 at the underside.

The adjusting member 9 to be positioned in the recessed chamber 82 of the cover body 8 is bored with a polygonal recessed hole 90 in the center for the polygonal rod 63 of the top rod 6 to be inserted therein and annularly disposed with lots of engage notches 91 at the lower circumferential edge. The adjusting member 9 is fixed with a projecting post 92 extending downward from the bottom and having its lower side fixed with a stop flange 94. The projecting post 92 is inserted through the insert hole 84 in the recessed chamber 82 of the cover body 8, with the lower part of the projecting post 92 extending out of the bottom of the cover body 8, the stop flange 94 of the projecting post 92 resisting against the bottom of the cover body 8, and the circumferential wall of the insert hole 84 of the cover body 8 stuck in the annular recess 93 of the projecting post 92. Additionally, the projecting post 92 has its lower part formed with a polygonal rod and its bottom cut with a slit 95.

Figure 6:
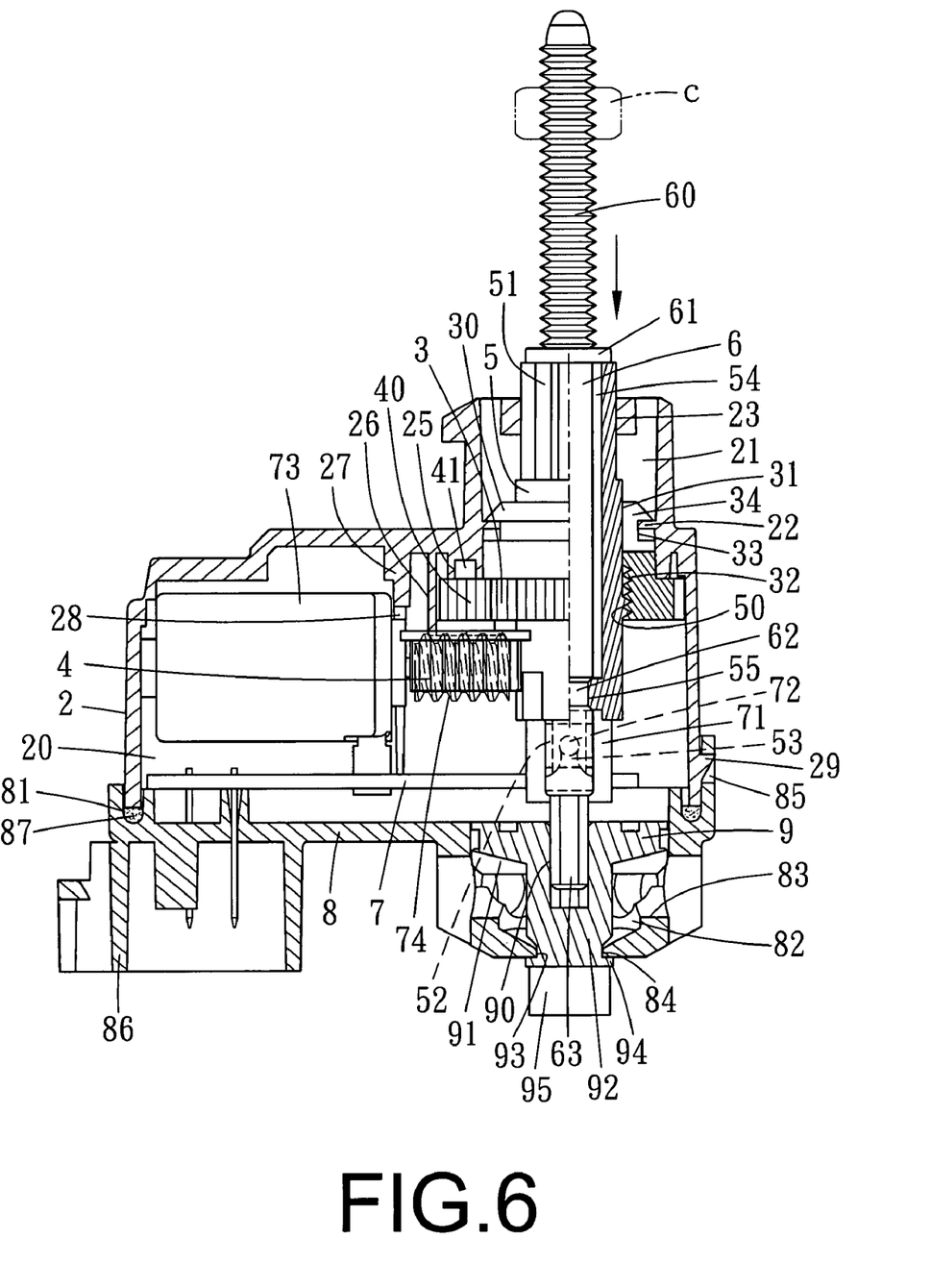
FIG. 6 is a side cross-sectional view of the first preferred embodiment of the step-by-step motor in the present invention.
Figure 7:
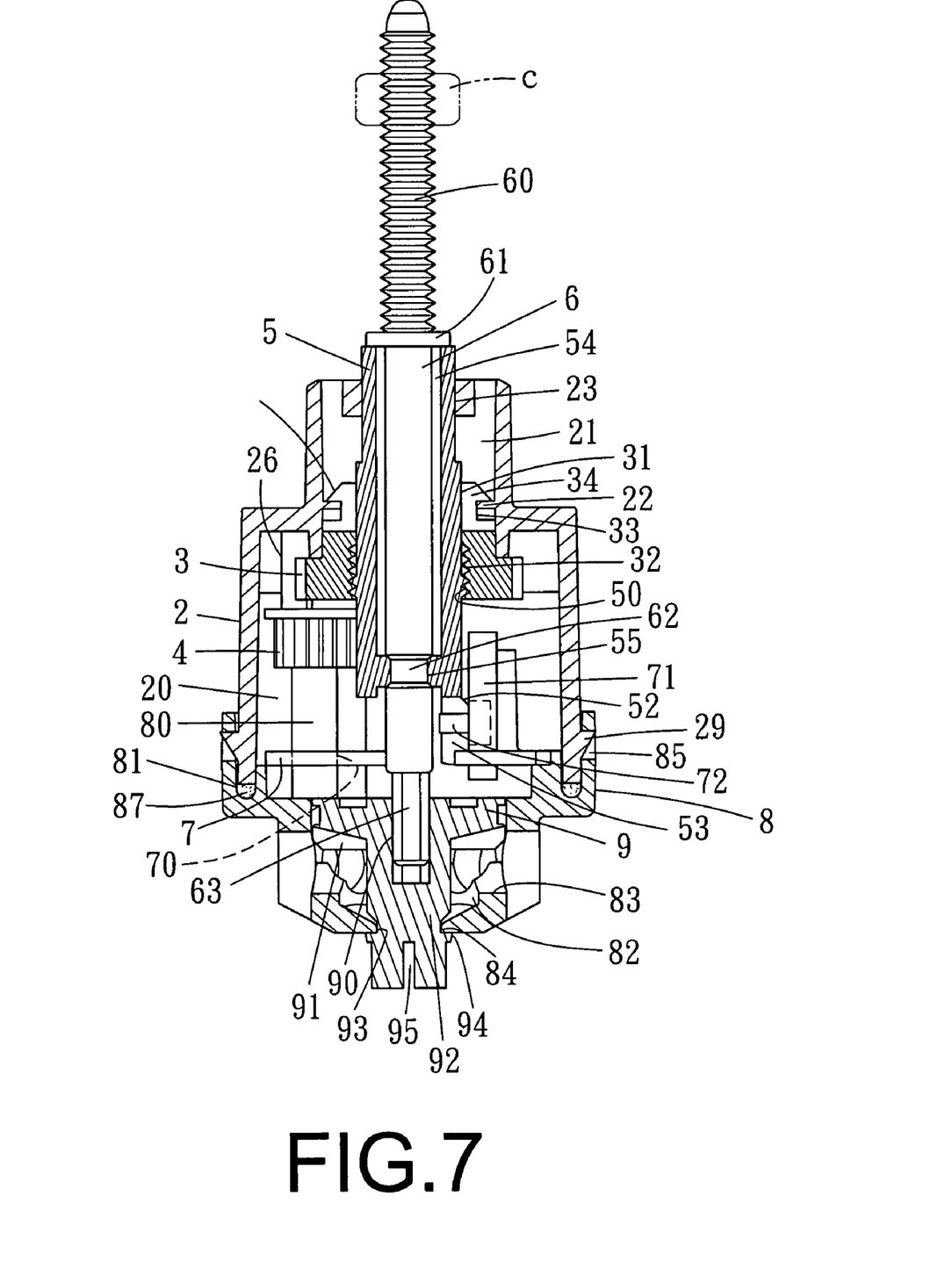
FIG. 7 is another side cross-sectional view of the first preferred embodiment of the step-by-step motor in then present invention.
Figure 8:
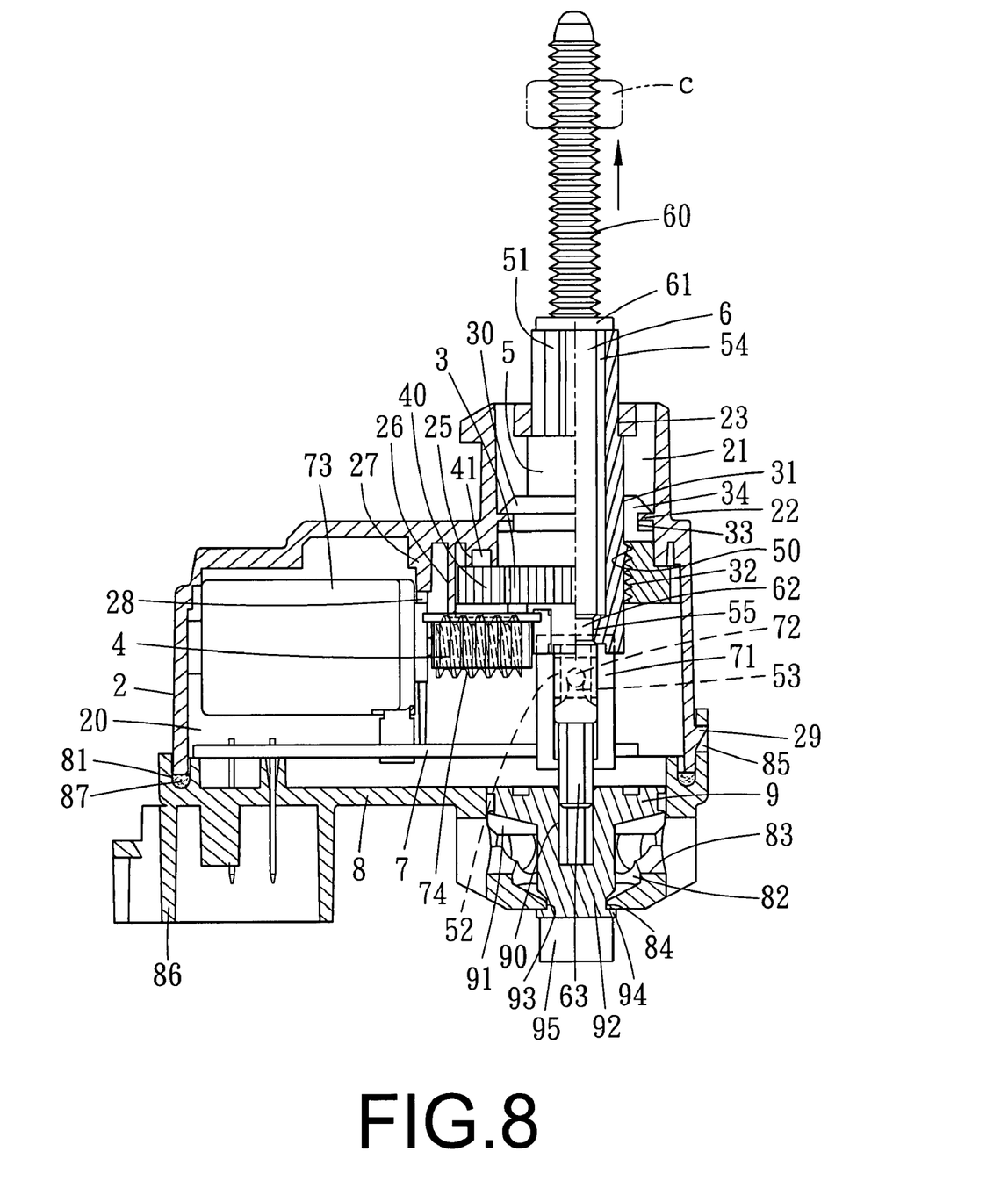
FIG. 8 is a side cross-sectional view of the first preferred embodiment of the step-by-step motor having its top rod moved upward in the present invention.

In using, as shown in FIGS. 6, 7 and 8, firstly, the top rod 6 has its upper male threads 60 threadably combined with a part (C) connected with the headlamp of an automobile. To adjust upward the elevation angle of the headlamp, the circuit boar 7 is electrically connected with the electric circuit of the automobile to control the transmitting motor 73 to operate and actuate the worm 74 and the worm gear 4 mutually engaged to rotate, and synchronously the transmitting gear 40 on the worm gear 4 will actuate the driven gear 3 to rotate. At this time, the interacting member 5, which is threadably combined with the driven gear 3 and has its lengthwise projections 51 restrictedly engaged in the positioning engage notches 24 of the housing 2, is unable to rotate together with the driven gear 3, but can only be moved upward by relative action of the male threads 50 of the interacting member 5 and the female threads 32 of the driven gear 3. Simultaneously, the top rod 6 positioned in the interacting member 5 will be moved upward to actuate the part (C) together with the headlamp to move upward. When the interacting member 5 is driven by the driven gear 3 to move upward, the interacting block 52 at the lower side of the interacting member 5 will actuate the cross bar 72 of the position-limiting switch 71 on the circuit board 7 to move upward, and when the cross bar 72 is moved to the upper end of the position-limiting switch 71, (at this time, the top rod 6 reaches its highest position, as shown in FIG. 8), the position-limiting switch 71 will cut off electricity and the transmitting motor 73 will stop operating, thus finishing adjusting upward the elevation angle of the headlamp.

On the contrary, to adjust downward the elevation angle of the headlamp, the transmitting motor 73 is controlled by the circuit board 7 to operate reversely to actuate the worm 74 and the worm gear 4 to rotate reversely. Synchronously, the transmitting gear 40 on the worm gear 4 will drive the driven gear 3 to rotate reversely, and the interacting member 5 threadably combined on the driven gear 3 and the top rod 6 engaged with the coupled member 5 will be driven to move downward and actuate the headlamp to descend. When driven to move downward by the driven gear 3, the interacting member 5 will actuate the cross bar 72 of the position-limiting switch 71 to move downward, and when the projecting rod 72 is moved to the lower end of the circuit board 7 (At this time, the top rod 6 reaches its lowest position, as shown in FIG. 6), the position-limiting switch 71 will break electric circuit to stop the transmitting motor 73 in operating, thus finishing adjusting the headlamp to move downward.

Figure 9:
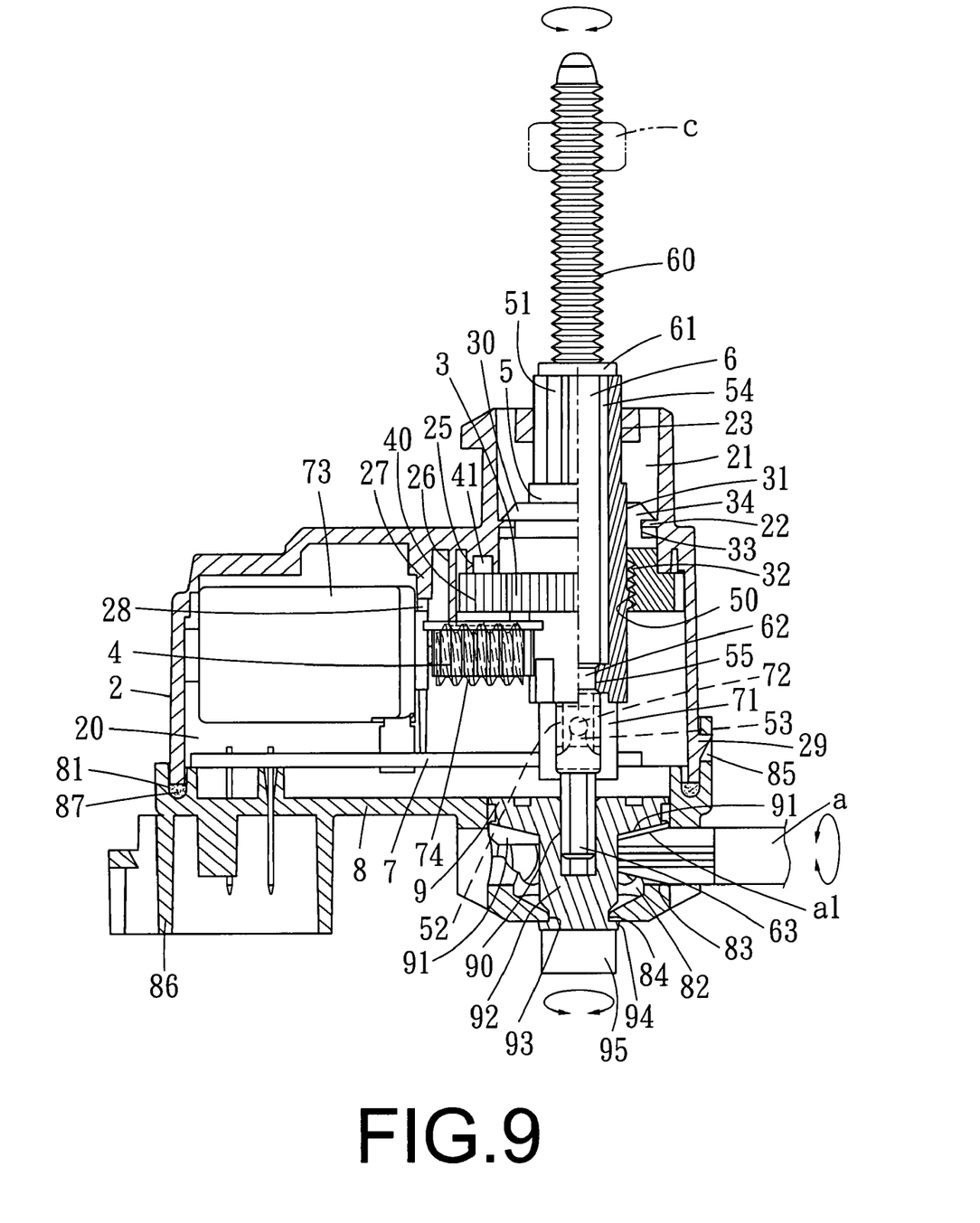
FIG. 9 is a side cross-sectional view of the first preferred embodiment of the step-by-step motor having the top rod adjusted from the exterior of a cover body in the present invention.

When the step-by-step motor of this invention is installed in an automobile, but the transmitting motor 73 cannot be started to operate, the level of the headlamp can be manually adjusted by means of an adjustment tool (a) inserted in the interior of the cover body 8. The adjustment tool (a) is provided with engage teeth (a1) matching with the engage notches 91 of the adjusting member 9. The adjustment tool (a) is inserted through one of the through holes 83 in the circumferential wall of the recessed chamber 82 from the exterior of the cover body 8 to have its engage teeth (a1) engaged with the engage notches 91 of the adjusting member 9. When the adjustment tool (a) is turned, the adjusting member 9 will be driven to rotate, and when the adjustment tool (a) is turned again, the engage teeth (a1) will be engaged with a next engage notch 91 of the adjusting member 9. Thus, by turning around the adjustment tool (a) incessantly, the adjusting member 9 can be rotated and the top rod 6 inserted in the recessed hole 90 of the adjusting member 9 will be driven to rotate, and simultaneously the part (c) connected with the headlamp and threadably combined with the upper male threads 60 of the top rod 6 will be actuated to move upward or downward.

Figure 10:
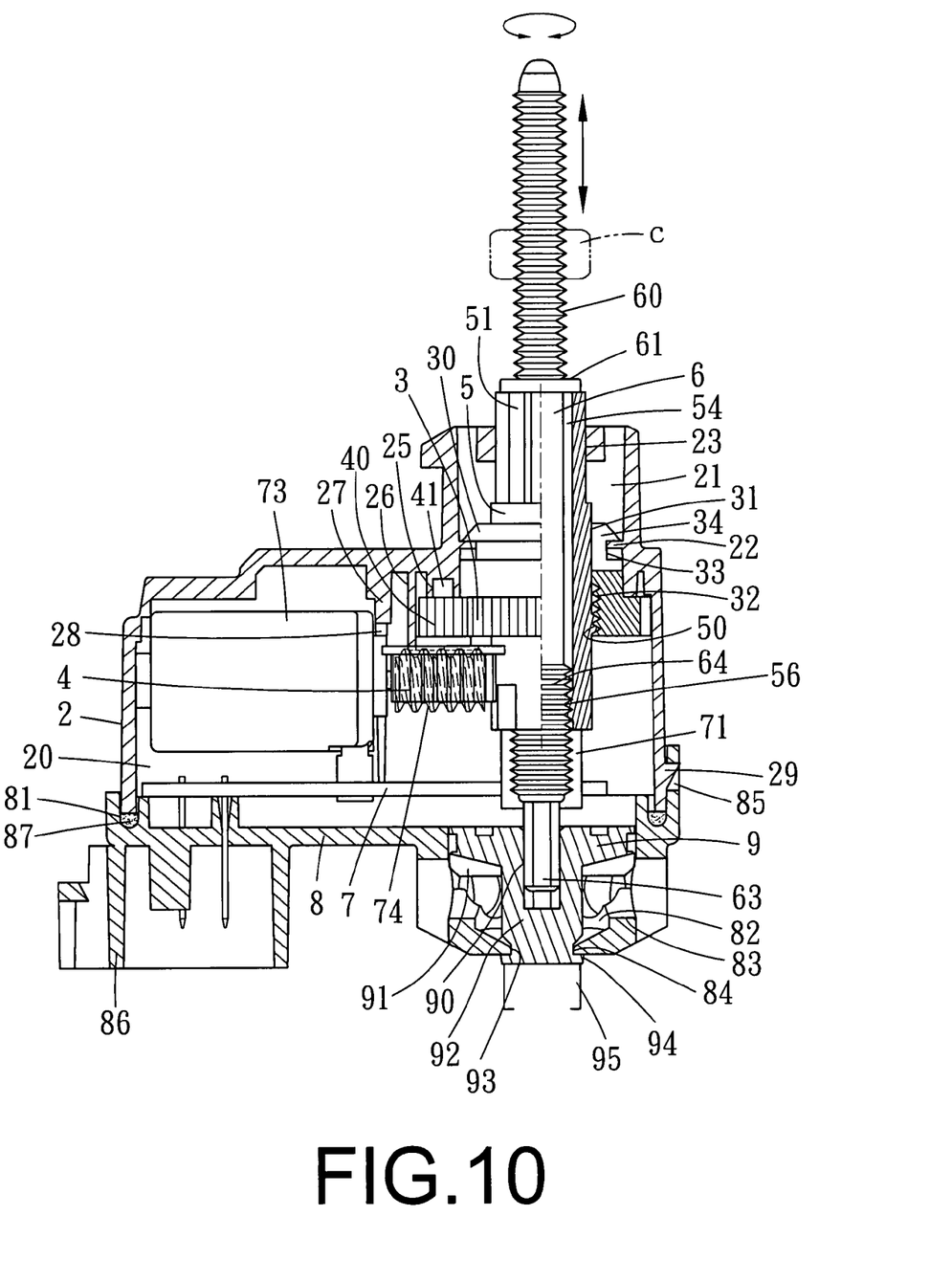
FIG. 10 is a side cross-sectional view of a second preferred embodiment of a step-by-step motor having its top rod adjusted in the present invention.

In addition, referring to FIG. 10, the top rod 6 can also be actuated to rotate for adjusting the headlamp to move upward or downward from the exterior of the step-by-step motor by means of an adjustment tool (b), which has the same shape as the slit 95 cut in the underside of the projecting post 92 of the adjusting member 9 and which is inserted and turned in the slit 95. By so designing, the headlamp of an automobile can be manually adjusted to move upward or downward by means of the adjustment tool operated from the exterior of the step-by-step motor, unnecessary to disassemble the inner members for adjustment. Moreover, the adjusting member 9 is received in the recessed chamber 82 of the cover body 8 so it can be stably positioned in the interior of the cover body 8 never to fall off.

A second preferred embodiment of a step-by-step motor able to carry out up-and-down motion in the present invention, as shown in FIG. 10, has the same members and the same transmission mode as those described in the first preferred embodiment, except that the interacting member 5 has its insert hole 54 provided therein with female threads 56, and the top rod 6 has its lower outer wall provided with male threads 64 to be engaged with the female threads 56 in the insert hole 54 of the interacting member 5. To adjust the level of the headlamp manually, only insert the adjustment tool (a) into the recessed chamber 82 of the cover body 8 through the through holes 83 in the circumferential wall of the recessed chamber 82, as shown in FIG. 9, or directly insert the adjustment tool (b) into the slit 95 at the underside of the projecting post 92 of the adjusting member 9, as shown in FIG. 10. When the adjustment tool (b) is turned around, the adjusting member 9 will be rotated, and the top rod 6 inserted in the recessed hole 90 of the adjusting member 9 will be synchronously actuated to rotate. When the top rod 6 is rotated, the interacting member 5, which has its lengthwise projections 51 restrictedly engaged in the positioning engage notches 24 of the housing 2, will be unable to rotate together with the top rod 6; therefore, the top rod 6 can be rotated to carry out up-and-down motion and actuate the part (c) together with the headlamp to ascend or descend by relative action of its male threads 64 and the female threads 56 of the interacting member 5, equally having function of adjusting the level of the headlamp from the exterior of the step-by-step motor.

While the preferred embodiments of the invention have been described above, it will be recognized and understood that various modifications may be made therein and the appended claims are intended to cover all such modifications that may fall within the spirit and scope of the invention.

What is claimed is:

1. A step-by-step motor able to carry out up-and-down motion comprising:

a housing formed with an accommodating chamber in the interior, said accommodating chamber disposed therein with a recessed chamber, said recessed chamber having its inner wall provided with engage projections, said recessed chamber provided with a central insert hole passing through a topside of said housing, said insert hole having its wall bored with lengthwise positioning engage notches spaced apart, said recessed chamber having one side disposed with a shaft hole having its outer circumference fixed with a blocking plate, said accommodating chamber having its inner wall assembled with a positioning plate with a notch, said housing having its outer peripheral wall formed with a plurality of engage projections spaced apart;

a driven gear received in said accommodating chamber of said housing, said driven gear having its upper side formed with a connecting block, said connecting block received in said recessed chamber of said housing, said connecting block bored with a central insert hole, said central insert hole having its lower section provided with female threads, said connecting block having its outer circumferential wall provided with an annular recess, said connecting block cut with two opposite notches;

a worm gear positioned at one side of said driven gear, said worm gear having its upper side fixed with a transmitting gear, said transmitting gear engaged with said driven gear, said transmitting gear provided thereon with a support shaft;

an interacting member inserted in both said insert hole of said driven gear and said insert hole of said housing, said interacting member having its outer circumferential wall provided with male threads, said interacting member having its upper outer wall formed with a plurality of lengthwise projections spaced apart equidistantly, said interacting member having its lower side fixed with an interacting block with an engage notch, said interacting member bored with a central insert hole, said central insert hole disposed therein with plural engage blocks near the lower end;

a top rod inserted through said central insert hole of said interacting member, said top rod having its upper section provided with male threads, said top rod having its wall fixed with a blocking flange, said top rod bored with an annular recess near the lower end, said engage blocks of said interacting member engaged with said annular recess of said top rod, said top rod having its lower end formed with a polygonal rod;

a circuit board installed in said accommodating chamber of said housing, said circuit board provided thereon with a position-limiting switch with a movable cross bar, said circuit board assembled thereon with a transmitting motor mounted thereon, said transmitting motor provided with a worm engaged with said worm gear;

a cover body covered on the bottom of said housing, said cover body formed with a recessed chamber in the interior, said recessed chamber having its circumferential wall bored with through holes, said recessed chamber bored with an insert hole at the bottom, said cover body having its outer peripheral edge bored with a plurality of engage slots, said cover body assembled with a bayonet socket at the underside; and an adjusting member positioned in said recessed chamber of said cover body, said adjusting member bored with a polygonal recessed hole in the center, said adjusting member having its lower circumferential edge annularly cut with lots of engage notches, said adjusting member secured with a projecting post extending downward from the bottom, said projecting post having its lower side cut with a slit.

2. The step-by-step motor able to carry out up-and-down motion as claimed in claim 1, wherein said circuit board is bored with a through hole, and said cover body is fixed with a positioning post to be fitted in said through hole for positioning said circuit board on said cover body.

3. The step-by-step motor able to carry out up-and-down motion as claimed in claim 1, wherein said cover body has its inner peripheral disposed with an annular recess for receiving a waterproof gasket therein.

4. A step-by-step motor able to carry out up-and-down motion comprising:

a housing formed inside with an accommodating chamber, said accommodating chamber bored with a recessed chamber, said recessed chamber having its inner wall disposed with plural engage projections, said recessed chamber bored with a central insert hole passing through a topside of said housing, said central insert hole having its wall cur with positioning engage notches spaced apart, said recessed chamber having one side bored with a shaft hole having its outer circumference fixed with a blocking plate, said accommodating chamber having its inner wall assembled with a positioning plate with a notch, said housing having its outer peripheral wall fixed with a plurality of engage members spaced apart;

a driven gear received in said accommodating chamber of said housing, said driven gear having its upper side formed with a connecting block, said connecting block received in said recessed chamber of said housing, said connecting block bored with a center insert hole, said center insert hole having its lower part provided with female threads, said connecting block having its outer circumferential wall provided with an annular recess, said connecting block cut with two opposite notches;

a worm gear assembled at one side of said driven gear, said worm gear having its upper side fixed with a transmitting gear, said transmitting gear engaged with said driven gear, said transmitting gear provided thereon with a support shaft;

an interacting member inserted through both said insert hole of said driven gear and said insert hole of said housing, said interacting member having its outer circumferential wall provided with male threads, said interacting member having its upper outer wall formed with a plurality of lengthwise projections spaced apart equidistantly, said interacting member having its lower side fixed with an interacting-block with an engage notch, said interacting member bored with an insert hole in the center, said insert hole provided therein with female threads;

a top rod inserted in said insert hole of said interacting member, said top rod having its upper section provided with male threads and its outer wall secured with an annular blocking plate, said top rod having its lower section provided with male threads engaged with said female threads of said interacting member, said top rod having its lower end fixed with a polygonal rod;

a circuit board assembled in said accommodating chamber of said housing, said circuit board provided thereon with a position-limiting switch with a movable cross bar, said circuit board installed thereon with a transmitting motor, said transmitting motor disposed with a worm engaged with said worm gear;

a cover body mounted on the bottom of said housing, said cover body provided with a recessed chamber in the interior, said recessed chamber having its circumferential wall bored with plural through holes spaced apart, said recessed chamber bored with an insert hole at the bottom, said cover body having its outer peripheral edge bored with a plurality of engage slots, said cover body fixed with a bayonet socket at the underside; and an adjusting member stably fitted in said recessed chamber of said cover body, said adjusting member bored with a polygonal recessed hole in the center, said adjusting member having its lower circumferential edge annularly cut with lots of engage notches, said adjusting member having its underside fixed with a projecting post extending downward, said projecting post having its bottom cut with a slit.

5. The step-by-step motor able to carry out up-and-down motion as claimed in claim 4, wherein said circuit board is bored with a through hole, and said cover body has a projecting post secured in the interior to be inserted through said through hole of said circuit board for positioning said circuit board on said cover body.

6. The step-by-step motor able to carry out up-and-down motion as claimed in claim 4, wherein said cover body has its inner peripheral edge bored with an annular recess for receiving a waterproof gasket therein.

\* \* \* \* \*